United States Patent [19]

Doyle

[11] Patent Number: 4,766,494
[45] Date of Patent: Aug. 23, 1988

[54] LINE NUMBER HAVING CIRCUIT FOR A SAMPLED INTERLACED TELEVISION SIGNAL

[75] Inventor: Terence Doyle, Eindhoven, Netherlands

[73] Assignee: U.S. Philips Corp., New York, N.Y.

[21] Appl. No.: 104,317

[22] Filed: Oct. 2, 1987

[30] Foreign Application Priority Data

Oct. 3, 1986 [NL] Netherlands .......................... 8602493

[51] Int. Cl.⁴ ............................................. H04N 5/02
[52] U.S. Cl. ................................... 358/140; 358/132; 358/180
[58] Field of Search ................ 358/140, 138, 180, 160

[56] References Cited

U.S. PATENT DOCUMENTS

| | | | |
|---|---|---|---|
| 4,402,012 | 8/1983 | Knight | 358/180 X |
| 4,417,276 | 11/1983 | Bennett et al. | 358/180 X |
| 4,496,974 | 1/1985 | Heitmann | 358/140 |
| 4,578,314 | 7/1986 | Reimers | 358/140 |

*Primary Examiner*—Howard W. Britton
*Assistant Examiner*—Victor R. Kostak
*Attorney, Agent, or Firm*—Gregory P. Gadson

[57] ABSTRACT

In a line number halving circuit for a sampled interlaced television signal in one field the signal samples of a line (0, 4, 8) cancelled during halving are placed between the signal samples of an underlying or overlying maintained line (2, 6, 10) while in the other field alternately a signal sample of the overlying line (1, 5, 9) and of the underlying cancelled line (5, 9, 13) is placed between the successive signal samples of a maintained line (3, 7, 11) in order to prevent position errors in a picture displayed with the television signal halved in line number.

2 Claims, 1 Drawing Sheet

LINE NUMBER HAVING CIRCUIT FOR A SAMPLED INTERLACED TELEVISION SIGNAL

BACKGROUND OF THE INVENTION

The invention relates to a line number halving circuit for a sampled interlaced television signal for obtaining an interlaced television signal which is halved in line number and is doubled in its number of signal samples per line, the sampling in the sampled television signal to be halved in line number being shifted one hundred and eighty degrees from line to line and ninety degrees from field to field, and the doubling of the number of signal samples per line being obtained by placing signal samples of field lines being cancelled during line number halving between signal samples of field lines being maintained and extended in duration during line number halving.

The function of a line number halving circuit of the type mentioned above is described in Neues aus der Technik, 1986, no. 2, page 6.

When using such a line number halving circuit a displayed interlaced picture of half the line number of the original picture is found to give the impression that pair formation, be it small, occurs.

SUMMARY OF THE INVENTION

It is an object of the invention to prevent this phenomenon.

To this end a line number halving circuit of the type described in the opening paragraph is characterized in that it is adapted to place in one of the two fields of each picture between the successive signal samples of the lines which are maintained alternately a signal sample of the horizontally intermediate position of the overlaying and of the underlying cancelled line of that field.

Due to this measure it is obtained that in each field in the television signal halved in line number, the information corresponds in average position to that in the television signal to be halved in line number so that the impression of pair formation upon display of a picture with half the line number of the original picture no longer occurs. The compatibility is improved thereby, whilst the possibility of an improved display by means of the use of a line number doubling and a rearrangement of the signal samples in accordance with those in the originally sampled television signal is maintained.

BRIEF DESCRIPTION OF THE DRAWINGS

The invention will now be described in greater detail with reference to the accompanying drawings.

In the drawings.

DETAILED DESCRIPTION OF THE INVENTION

Figure 1:
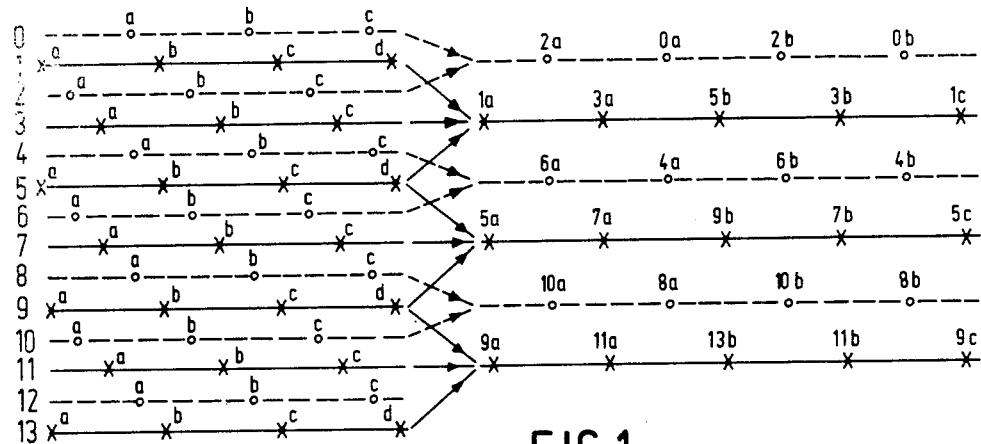
FIG. 1 shows the rearrangement of the television signal samples of a television signal to be halved in line number to that of a television signal halved in line number by means of a line number halving circuit according to the invention.

The left-hand part of FIG. 1 shows a portion of a number of lines 0, 1, 2, 3, 4, 5, 6, 7, 8, 9, 10, 11, 12, 13 of a sampled television signal to be halved in line number and the right-hand part shows a portion of a number of lines of a sampled television signal halved in line number. The solid lines are of a first field, the broken lines of a second field of an interlaced picture. As an example, the left-hand part may be associated with a 1250-line interlaced picture of 50 fields and hence 25 pictures per second and the right-hand part may be associated with a 625-line interlaced picture likewise of 50 fields and hence 25 pictures per second.

The signal samples of the television signals of a first field of a picture are denoted by crosses and those of a second field of said picture are denoted by circles. The sampling of the television signal to be halved in line number is shifted one hundred and eighty degrees from line to line and ninety degrees from field to field. The signal samples in the left-hand part have a character designation a, b, c or d. During line number halving the signal samples of lines cancelled during halving are placed between those of maintained lines which are doubled in duration so that the total number of signal samples of the duration-extended lines of the picture halved in line number equals the number of signal samples of the picture to be halved in line number, and thus the picture halved in line number has the same quantity of information which means twice as much per line.

The signal samples of the right-hand part are marked with a figure indicating from which line number of the left-hand part they originate and with a character indicating which sample of the relevant line it is.

During line number halving of the first field alternately samples of the overlaying lines enumerated 1, 5, . . . and of the underlying lines enumerated 5, 9, . . . are placed between the samples of the lines enumerated 3, 7, . . . so that the position of the composite line in the right-hand part corresponds to that of the lines enumerated 3, 7, . . . in the left-hand part.

During line number halving of the second field the samples of the lines enumerated 0, 4, . . . are placed between those of the lines enumerated 2, 6, . . . , so that the position of the composite line in the right-hand part corresponds to the average position of the lines 0, 2; 4, 6; . . . in the left-hand part. Then there is no pair formation in a displayed picture. In a circuit arrangement in which the line number halving operation is effected it is to be further ensured that the periods in which the samples of the composite lines are supplied correspond to those fitting in two interlaced fields.

Figure 2:
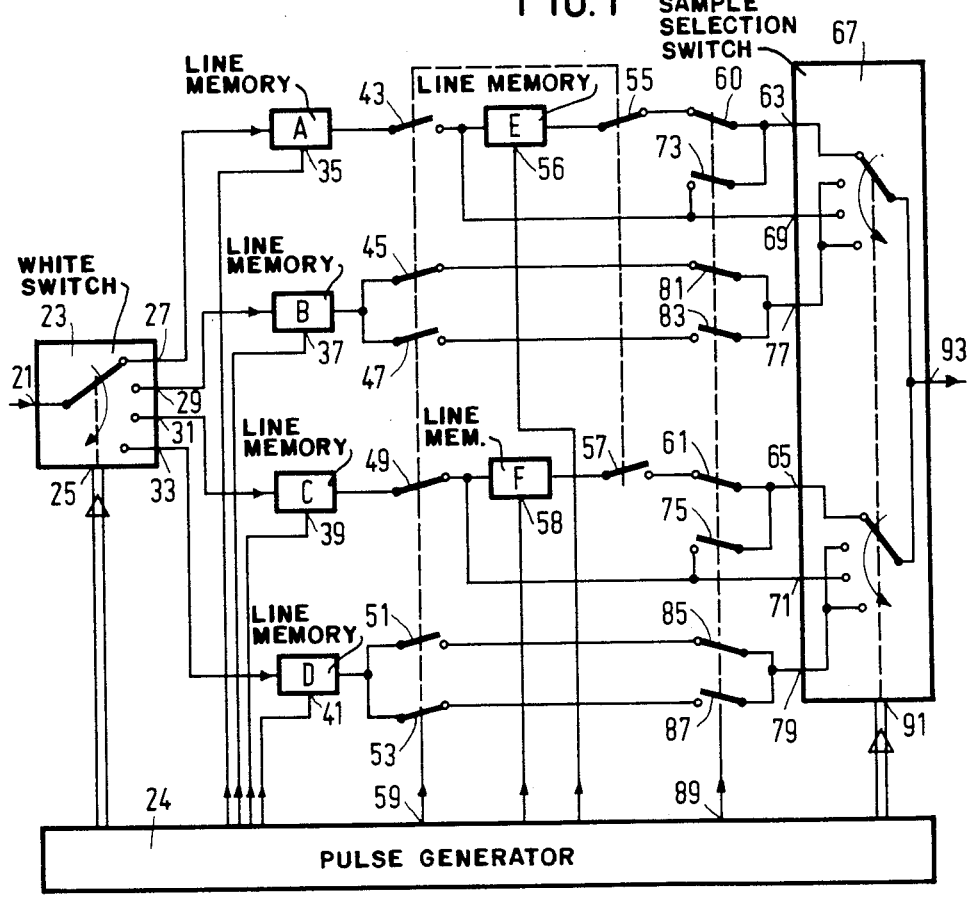
FIG. 2 shows by means of a block-schematic diagram a line number halving circuit according to the invention with which the rearrangement of the signal samples of FIG. 1 can be obtained.

Such a circuit arrangement is shown in FIG. 2.

In FIG. 2 the sampled television signal to be halved in line number and illustrated in the left-hand part of FIG. 1 is applied to an input 21 of a write switch 23. The write switch 23 has four positions each of which is occupied during a successive line period of the television signal applied to the input 21 under the influence of a switching signal combination applied to an input combination 25 and originating from a pulse generator 24, whereafter this cycle is repeated each time. Outputs 27, 29, 31, 33 of the write signal 23 are then successively connected to the input 21 thereof so that the television signal is applied to an input of line memories A, B, C, D, respectively.

While the television signal is being applied to the memories A, B, C, D, inputs 35, 37, 39, 41 thereof receive a write clock signal from the pulse generator 24, which write clock signal has a phase adapted to the sampling of the television signal to be written into the relevant memory.

The output of the line memory A is connected to a read switch 43, that of the line memory B is connected to two read switches 45, 47, that of the line memory C is connected to a read switch 49 and that of the line memory D is connected to two read switches 51, 53.

The other connections of the read switches 43 and 49 are connected to the inputs of line memories E and F, respectively, whose outputs are connected to read switches 55 and 57 and whose clock signal inputs 56 and 58 receive a write or read clock signal from the pulse generator 24.

The read switches 43, 45, 47, 49, 51, 53, 55 and 57 are odically occupies the next one of the four possible positions in the rhythm in which the signal samples occur so that an output 93 of the sample selection switch is periodically and successively connected to its inputs 63 and 65, 77 and 79, 69 and 71, 77 and 79, respectively.

For the sake of clarity the process is illustrated in the Table below in which the enumeration of the lines and fields of FIG. 1 is used and in which the upper position of a switch has the designation H, the lower position has the designation L and the second and third positions of the write switch 23 have the designations MH and ML, respectively.

| Field | Line No. | Position switch 23 | Writing of memories A, B, C, D | Position read switches | Writing of memories E, F | Position field selection switches | Reading to sample selection switch 67 |
|---|---|---|---|---|---|---|---|
| First | 1 | H | A | H | — | H | — |
| " | 3 | MH | B | L | E from A(1) | H | — |
| " | 5 | ML | C | L | E from A(1) | H | — |
| " | 7 | L | D | H | F from C(5) | H | E(1), B(3), C(5) |
| " | 9 | H | A | H | F from C(5) | H | |
| " | 11 | MH | B | L | E from A(9) | H | F(5), D(7), A(9) |
| " | 13 | ML | C | L | E from A(9) | H | |
| " | 15 | L | D | H | F from C(13) | H | E(9), B(11), C(13) |
| second | 0 | H | A | H | — | L | |
| " | 2 | MH | B | H | — | L | |
| " | 4 | ML | C | L | — | L | A(0), B(2) |
| " | 6 | L | D | L | — | L | |
| " | 8 | H | A | H | — | L | C(4), D(6) |
| " | 10 | MH | B | H | — | L | |
| " | 12 | ML | C | L | — | L | A(8), D(10) |
| " | 14 | L | D | L | — | L | | simultaneously operated by a switching signal obtained from an output 59 of the pulse generator 24 and occupy the upper position (shown) during the first line of the first field of the television signal to be halved in line number, the lower position (not shown) during the subsequent two lines, then again the upper position during two lines and the lower position during the subsequent two lines, and so forth. In the second field of the television signal to be halved in line number these read switches occupy the upper position during the first two lines, the lower position during the subsequent two lines, the upper position again during the then following two lines, and so forth.

The other connections of the read switches 55 and 57 are connected to field selection switches 60 and 61 the other connections of which are connected to inputs 63 and 65, respectively, of a sample selection switch 67. Further inputs 69 and 71 of the sample selection switch 67 are connected to the inputs of the line memories E and F, and to field selection switches 73 and 75, respectively, the other connections of which are connected to the inputs 63 and 65 of the sample selection switch 67.

Inputs 77 and 79 of the sample selection switch 67 are connected to first and second pairs of field selection switches 81, 83 and 85, 87, respectively, the other ends of which are connected to the read switches 45, 57 and 51, 53, respectively.

The field selection switches 60, 73, 81, 83, 61, 75, 85 and 87 are simultaneously operated by a field switching signal originating from an output 89 of the pulse generator 24 and occupy the upper position (shown) during the first field of a picture of the television signal to be halved in line number and they occupy the lower position (not shown) during the second field.

Under the influence of a signal combination applied to an input 91 and originating from the pulse generator 24 the sample selection switch 67 successively and peri- In the reading column of the table it has been indicated between brackets behind the memory indication from which line number of FIG. 1 the information read originates. As in the second field reading of the memories to the sample selection switch 67 starts one line period earlier than in the first field, that is, one line period, of the television signal to be halved in line number, that is to say, half a line period of the television signal halved in line number, a correct mutual time division of the fields is obtained.

If the second field of the television signal to be halved in line number is lower in position than the first, the same circuit arrangement can be used, provided that the processing of the fields is interchanged with respect to the above-mentioned processing operations.

It will be evident that the functions of the switches can be fulfilled by different combinations of switches.

I claim:

1. A line number halving circuit for a sampled interlaced television signal for obtaining an interlaced television signal which is halved in line number and is doubled in its number of signal samples per line, comprising means for shifting one hundred and eighty degrees from line to line and ninety degrees from field to field, the sampling in the sampled television signal to be halved in line number, means for doubling the number of signal samples per line by placing signal samples (0a, 0b, 4a, 4b; 8a, 8b) of field lines (0, 4, 8) being cancelled during line number halving between signal samples (2a, 2b; 6a, 6b; 10a, 10b) of field lines (2, 6, 10) being maintained and extended in duration during line number halving, said line number halving circuit further comprising means for placing in one of the two fields of each picture between the lines (3, 7, 11) which are maintained, alternately a signal sample of horizontally intermediate position of the overlying (1a, 1c; 5a, 5c; 9a, 9c) (1, 5, 9) and of the underlying (5b; 9b; 13b) cancelled line (5, 9, 13) of that field.

2. A line number halving method for a sampled interlaced television signal for obtaining an interlaced television signal which is halved in line number and is doubled in its number of signal samples per line, comprising the steps of shifting one hundred and eighty degrees from line to line and ninety degrees from field to field, the sampling in the sampled television signal to halved in line number, doubling the number of signal samples per line by placing signal samples (0a, 0b, 4a, 4b; 8a, 8b) of field lines (0, 4, 8) being cancelled during line number halving between signal samples (2a, 2b; 6a, 6b; 10a, 10b) of field lines (2, 6, 10) being maintained and extended in duration during line number halving, said line number halving method further comprising placing in one of the two fields of each picture between the lines (3, 7, 11) which are maintained, alternately a signal sample of horizontally intermediate position of the overlying (1a, 1c; 5a, 5c; 9a, 9c) (1, 5, 9) and of the underlying (5b; 9b; 13b) cancelled line (5, 9, 13) of that field.

* * * * *